United States Patent Office 3,468,181
Patented Sept. 23, 1969

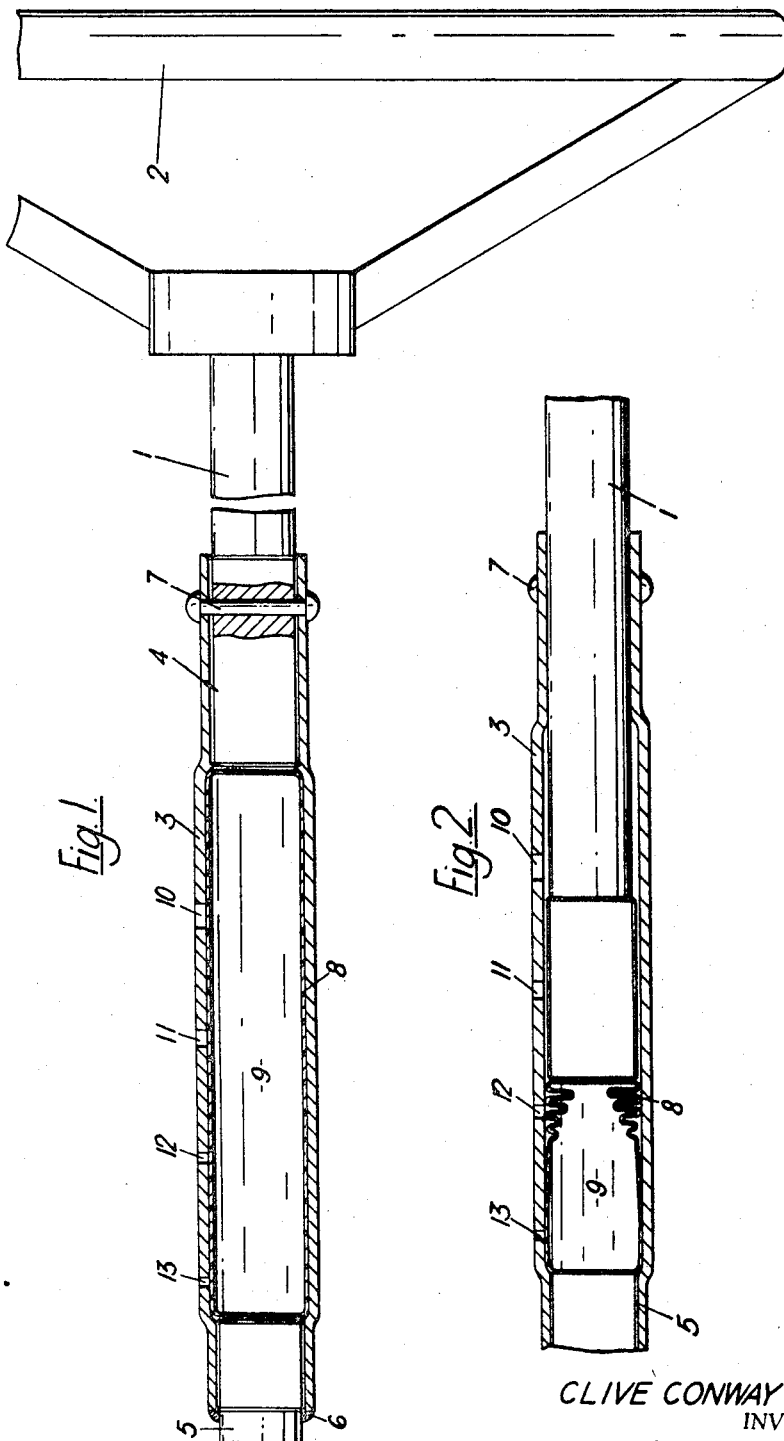

3,468,181
MOTOR VEHICLE STEERING ASSEMBLIES
Clive C. Millar, Romford, England, assignor to Ford Motor Company, Dearborn, Mich., a corporation of Delaware
Filed Apr. 5, 1967, Ser. No. 628,772
Claims priority, application Great Britain, July 7, 1966, 30,530/66
Int. Cl. B62d 1/18
U.S. Cl. 74—492                                1 Claim

ABSTRACT OF THE DISCLOSURE

An energy absorbing motor vehicle steering assembly in which a steering column is adapted to collapse telescopically under an applied axial force above a predetermined value comprising a tubular steering shaft part containing a liquid in a closed bag. A second steering shaft part is constructed to collapse the bag upon impact whereby the liquid is permitted to escape through control orifices in the tubular part.

BRIEF SUMMARY OF THE INVENTION

According to the present invention a steering assembly, comprising a steering wheel mounted on a steering column which collapses telescopically under an applied axial force above a predetermined value, is characterized in that axial collapse of the column pressurizes fluid contained in the column and the pressurized fluid escapes from the column so that the steering wheel is retarded during its movement from its extended to its collapsed position.

BRIEF DESCRIPTION OF THE DRAWINGS

How the invention may be carried out will now be description with reference to the accompanying drawings in which:

FIGURE 1 is a fragmentary cross-sectional view of a part of a steering assembly constructed in accordance with the present invention showing the column in its extended position; and FIGURE 2 is a view similar to FIGURE 1 showing the column in a partially collapsed condition.

DETAILED DESCRIPTION OF THE INVENTION

The steering assembly includes a steering column which comprises a first shaft 1 with a steering wheel 2 at its upper end. A tube 3 is splined at 4 to the shaft 1. A second shaft 5 is welded to the tube 3 at 6. The lower end of the second shaft 5 is connected to a steering gear (not shown) through an arrangement (not shown) which ensures that the steering column is not pushed bodily backwards into the passenger compartment in the event of a head-out collision.

Telescopic movement of the shaft 1 relatively to the tube 3 is normally prevented by a shearable rivet 7 which passes through both the shaft 1 and the tube 3.

A flexible container 8, in the form of a closed plastic bag, is located within the tube 3 between the ends of the shafts 1 and 5. A colored liquid 9 fills the container 8.

Four orifices 10 to 13, respectively, are formed in the wall of the tube 3. The orifices decrease in size from the steering wheel end of the column, i.e. 10 is larger than 11 which is larger than 12 which, in turn, is larger than 13 in cross-sectional area.

OPERATION

If the driver of the motor vehicle is thrown against steering wheel 2 with sufficient force, the resultant axial force applied to the rivet 7 by the shaft 1 will cause the rivet 7 to shear and to allow the shaft 1 to slide along the splines 4 relatively to the tube 3.

This telescopic movement of the shaft 1 pressurizes the liquid 9 in the plastic bag 8 until the liquid pressure reaches a sufficiently high value to puncture the wall of the bag in the vicinity of the hole 10. The bag punctures at the orifice 10, rather than at any of the other 11 to 13 orifices because the latter are of smaller cross-sectional area.

The resultant leakage of liquid from the bag 8 through the orifice 10 allows the bag 8 to collapse relatively slowly, thus retarding the movement of the steering wheel 2 toward its fully collapsed position.

When the free end of the shaft 1 passes the orifice 10, the pressure of the liquid in the bag against starts to build up and further axial movement of the shaft 1 pressurizes the liquid sufficiently to cause the wall of the bag 8 in the vicinity of the orifice 11 to puncture. The liquid 9 then leaks out of the orifice 11 to slowly retard the collapse of the steering column.

This process is repeated with the orifices 12 and 13 until the shaft 1 finally "bottoms out" against the shaft 5, the empty plastic bag 8 being sandwiched between the two shafts 1 and 5. FIGURE 2 shows the column in a partially collapsed condition with the liquid leaking from the orifice 12.

It can be appreciated that by providing a sufficient number of orifices a more or less gradual or progressive retardation of the steering wheel can be achieved. A single orifice could, however, be employed to retard the steering wheel. It would also be possible to employ valves in place of the orifices, each valve having a greater opening pressure than the valve immediately preceding it, and a hydraulic piston fitted on the end of the shaft 1 to pressurize liquid contained directly within the tube 3, the flexible container 8 being dispensed with.

The foregoing description constitutes the presently preferred embodiment of this invention. Modifications and alterations may occur to those skilled in the art that will come within its scope and spirit.

I claim:

1. An energy absorbing steering column assembly comprising a steering wheel, a steering shaft means connected to said wheel at one end and constructed to be connected to a steering gear at its other end, said shaft means including first and second telescopically related shaft portions, said first shaft portion comprising a tubular member, said second shaft portion being slidably fitted in said first shaft portion, shearable means interconnecting said first and second shaft portions and constructed to release upon the application of a predetermined force upon said steering wheel to permit axial movement of said second shaft portion relative to said first shaft portion, said shaft portions being interconnected for the transmission of steering torque from said steering wheel to a steering gear, an elongated sealed flexible bag disposed within said tubular first shaft portion, a liquid disposed within said bag, a plurality of axially spaced orifices of graduated size in the side wall of said tubular first shaft portion and positioned adjacent said bag, said second shaft portion being constructed to exert a force upon said bag upon axial displacement of said second shaft portion relative to said first shaft portion whereby said liquid is pressurized, said bag being constructed to rupture at each of said holes in a progressive serial fashion as the pressure increases in said bag.

References Cited

UNITED STATES PATENTS

| | | | |
|---|---|---|---|
| 1,658,962 | 2/1928 | Aikens | 188—88 |
| 1,821,787 | 9/1931 | Black. | |
| 2,639,626 | 5/1953 | Snyder | 74—493 |
| 2,852,956 | 9/1958 | May | 74—493 |
| 3,097,725 | 7/1963 | Peterson. | |

MILTON KAUFMAN, Primary Examiner

U.S. Cl. X.R.

188—88